(12) United States Patent
Chien et al.

(10) Patent No.: US 9,338,347 B2
(45) Date of Patent: May 10, 2016

(54) ELECTRONIC DEVICE AND METHOD FOR ADJUSTING PHOTOGRAPHIC LAMP

(71) Applicant: Chiun Mai Communication Systems, Inc., New Taipei (TW)

(72) Inventors: Yu-Han Chien, New Taipei (TW); Chao-Yun Yu, New Taipei (TW); Li-Ly Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 120 days.

(21) Appl. No.: 14/011,785

(22) Filed: Aug. 28, 2013

(65) Prior Publication Data

US 2014/0307153 A1    Oct. 16, 2014

(30) Foreign Application Priority Data

Apr. 10, 2013    (TW) .............................. 102112592 U

(51) Int. Cl.
*H04N 5/222* (2006.01)
*H04N 5/232* (2006.01)
*H04N 5/235* (2006.01)

(52) U.S. Cl.
CPC ......... *H04N 5/23219* (2013.01); *H04N 5/2354* (2013.01)

(58) Field of Classification Search
CPC .......................... H04N 5/2256; H04N 5/2354
USPC ................................... 348/370, 371
See application file for complete search history.

(56) References Cited

U.S. PATENT DOCUMENTS

| | | | |
|---|---|---|---|
| 2008/0181597 A1* | 7/2008 | Tamura | ......................... 396/164 |
| 2008/0252749 A1* | 10/2008 | Fujiwara | ............ H04N 5/23219 348/224.1 |
| 2010/0254571 A1* | 10/2010 | Matsuura et al. | ............. 382/103 |

* cited by examiner

*Primary Examiner* — Twyler Haskins
*Assistant Examiner* — Quang Le
(74) *Attorney, Agent, or Firm* — Novak Druce Connolly Bove + Quigg LLP

(57) ABSTRACT

In a method for adjusting a photographic lamp of an electronic device, the electronic device obtains a preview image from a camera device of the electronic device, and obtains a brightness value of an ambient environment of the electronic device. When a human face is detected in the obtained preview image, the electronic device changes a current output power value of the photographic lamp to be a first output power value, according to the obtained brightness value. When no human face is detected in the obtained preview image, the electronic device changes the current output power value to be a second output power value according to the obtained brightness value.

17 Claims, 3 Drawing Sheets

ELECTRONIC DEVICE AND METHOD FOR ADJUSTING PHOTOGRAPHIC LAMP

BACKGROUND

1. Technical Field

Embodiments of the present disclosure relate to adjusting technology, and particularly to an electronic device and a method for adjusting a photographic lamp of the electronic device.

2. Description of Related Art

A user who uses an electronic device (eg., a mobile phone) having a camera device, to capture images, usually uses a photographic lamp for making flash compensation. However, captured images may not meet the requirements of the user, as the photographic lamp may be over-flashed or under flashed. In particularly, when the user wants to capture an image that includes a human face, it is important to control the photographic lamp to make flash compensation properly. Therefore, a more efficient method for adjusting the photographic lamp is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other storage medium.

Figure 1:
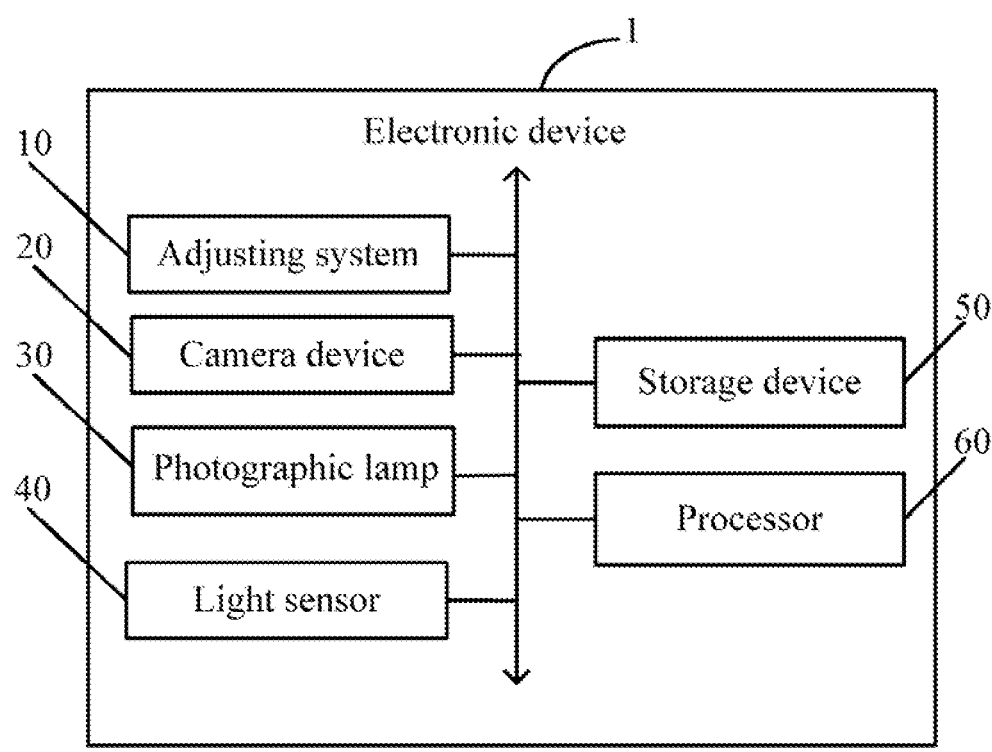
FIG. 1 is a block diagram of one embodiment of an electronic device comprising an adjusting system.

FIG. 1 is a block diagram of one embodiment of an electronic device 1 including an adjusting system 10. The electronic device 1 may be a mobile phone, a personal digital assistant (PDA), or any other computing device. The electronic device 1 further includes a camera device 20, a photographic lamp 30, a light sensor 40, a storage device 50, and at least one processor 60.

In one embodiment, the photographic lamp 30 is a light emitting diode (LED) light. The adjusting system 10 controls the photographic lamp 30 to make flash compensation, for the camera device 20 properly according to an obtained brightness value of an ambient environment of the electronic device 1, when the camera device 20 is used to capture images. Details will be given in the following paragraphs.

In one embodiment, the adjusting system 10 obtains the brightness value from the camera device 20. In other embodiments, the adjusting system 10 obtains the brightness value from the light sensor 40.

Figure 2:
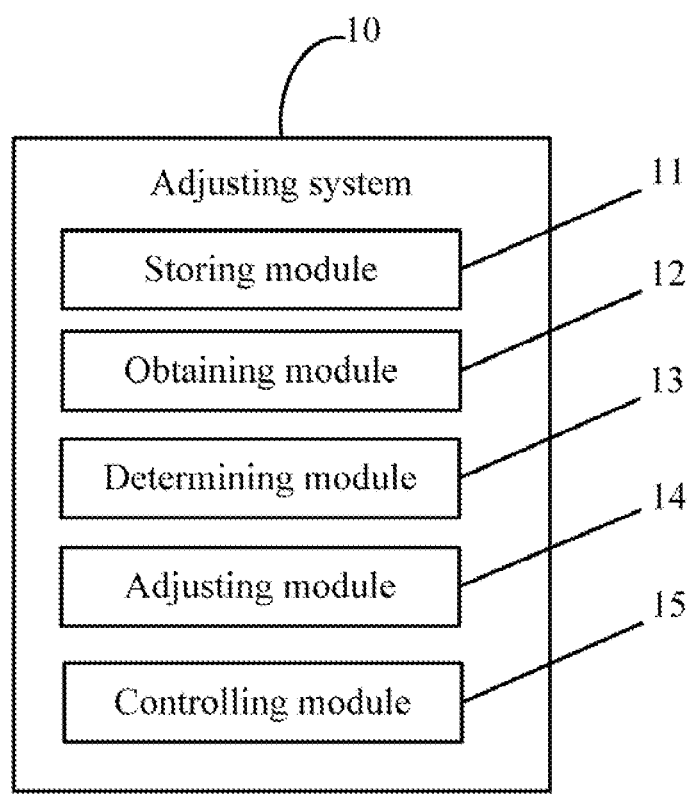
FIG. 2 is a block diagram of function modules of the adjusting system included in the electronic device of FIG. 1.

FIG. 2 is a block diagram of function modules of the adjusting system 10 included in the electronic device 1 of FIG. 1. In one embodiment, the adjusting system 10 may include a storing module 11, an obtaining module 12, a determining module 13, an adjusting module 14, and a controlling module 15. The modules 11-15 comprise computerized codes in the form of one or more programs that may be stored in the storage device 50. The computerized code includes instructions that are executed by the at least one processor 60.

Figure 3:
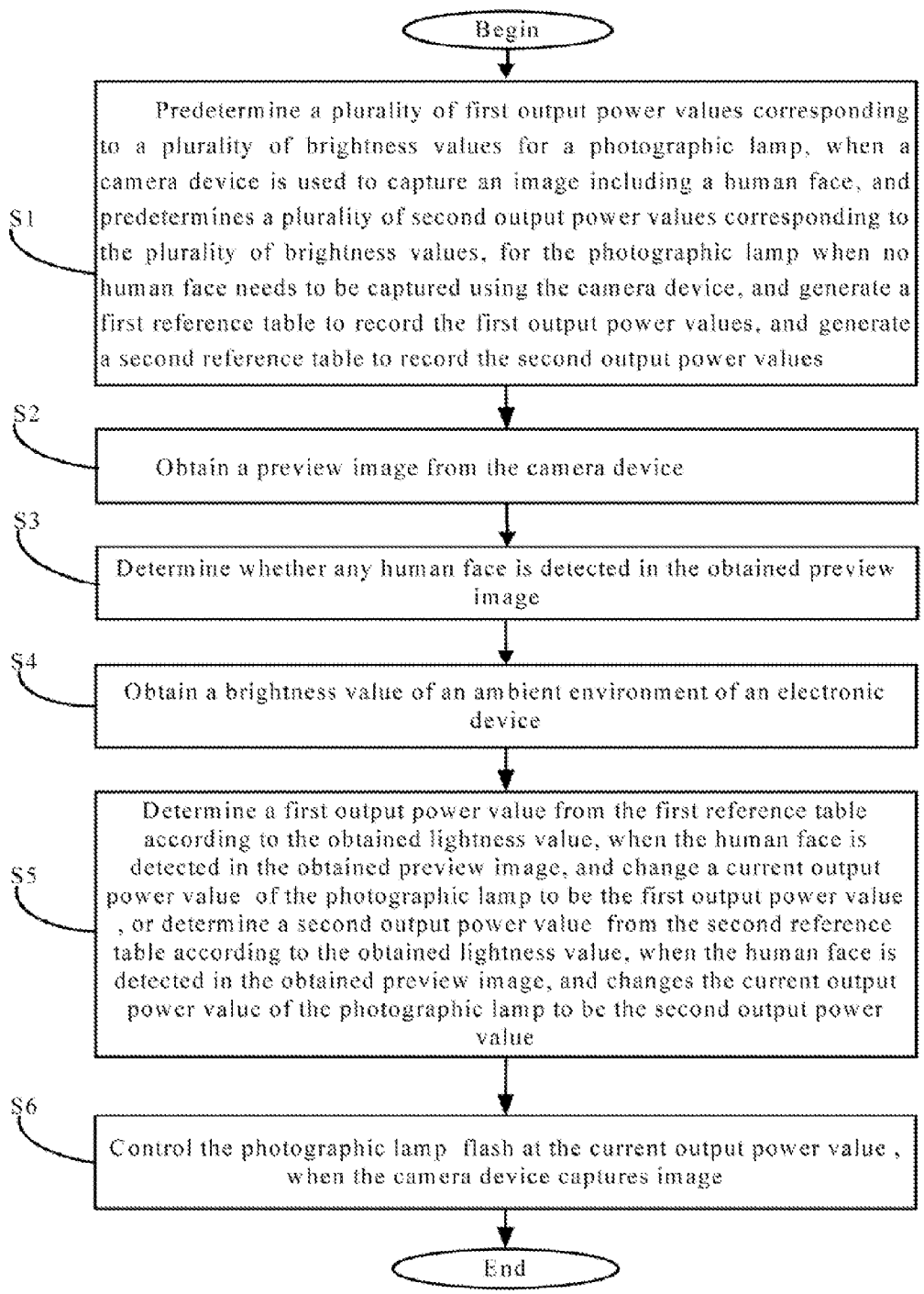
FIG. 3 is a flowchart of one embodiment of a method of adjusting a photographic lamp.

FIG. 3 is a flowchart of one embodiment of a method of adjusting the photographic lamp 30. Depending on the embodiment, additional steps may be added, others deleted, and the ordering of the steps may be changed.

In step S1, the storing module 11 predetermines a plurality of first output power values corresponding to a plurality of brightness values, for the photographic lamp 30 when the camera device 20 is used to capture an image including a human face, and predetermines a plurality of second output power values corresponding to the brightness values, for the photographic lamp 30 when no human face needs to be captured using the camera device 20.

The storing module 11 further generates a first reference table to record the first output power values, and generates a second reference table to record the second output power values. The storing module 11 stores the first and second reference table in the storage device 50.

For example, a first output power value of the photographic lamp 30 is 50 Ws (watts) corresponding to a brightness value which is less than 100 lux, when the camera device 20 is used to capture the image including the human face.

For another example, a second output power value is 30 Ws corresponding to the brightness value which is less than 100 lux, when the camera device 20 is used to capture an image including no human face.

In step S2, the obtaining module 12 obtains a preview image from the camera device 20. For example, if a user wants to capture an image, the user opens the camera device 20, then the obtaining module 12 obtains the preview image.

In step S3, the determining module 13 determines whether any human face is detected in the obtained preview image. In one embodiment, the determining module 13 compares the obtained preview image with one or more pre-determined standard face templates, which are prestored in the storage device 50, to determine whether the obtained preview image includes the human face.

For example, if the obtained preview image includes one of the pre-determined standard face templates, then the determining module 13 determines the obtained preview image including the human face.

In step S4, the obtaining module 12 further obtains a brightness value of an ambient environment of the electronic device 1. In one embodiment, the obtaining module 12 obtains the brightness value from the camera device 20. In other embodiments, the obtaining module 12 obtains the brightness value from the light sensor 40.

In step S5, when the human face is detected in the obtained preview image, the adjusting module 14 searches the first reference table and determines a first output power value of the photographic lamp 30, corresponding to the obtained brightness value, and changes a current output power value of the photographic lamp 30 to be the first output power value.

Furthermore, in step S5, when no human face is detected in the obtained preview image, the adjusting module 14 searches the second reference table and determines a second output power value of the photographic lamp 30, corresponding to the obtained brightness value, and changes the current output power value of the photographic lamp 30 to be the second output power value.

For example, when the human face is detected in the obtained preview image and the obtained brightness value is 80 lux, the adjusting module 14 searches the first reference table, and determines the first output power value of the photographic lamp 30 to be 50 Ws, as the obtained brightness value (80 lux) is less than 100 lux. The adjusting module 14 further changes the current output power value to be 50 Ws.

For another example, when no human face is detected in the obtained preview image and the obtained brightness value is 80 lux, the adjusting module 14 searches the second reference table, and determines the second output power value of the photographic lamp 30 to be 30 Ws, as the obtained brightness value (80 lux) is less than 100 lux. The adjusting module 14 further changes the current output power value to be 30 Ws.

In step S6, the controlling module 15 controls the photographic lamp 30 flash at the current output power value, when the camera device 20 captures the image. For example, if the current output power value of the photographic lamp 30 is changed from 50 Ws to be 30 Ws in step S5, the controlling module 15 controls the photographic lamp 30 to flash at 30 Ws, when the camera device 20 captures image.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for adjusting a photographic lamp of an electronic device, the electronic device comprising a camera device, a processor, the method comprising:
    predetermining a plurality of first output power values corresponding to a plurality of brightness values, for the photographic lamp used when the camera device is used to capture an image including a human face;
    predetermining a plurality of second output power values corresponding to the plurality of brightness values, for the photographic lamp used when no human face needs to be captured by the camera device;
    obtaining a preview image from the camera device;
    determining whether the human face is detected in the obtained preview image by using the processor;
    obtaining a brightness value of an ambient environment of the electronic device; and
    determining a first output power value of the photographic lamp corresponding to the obtained brightness value when the human face is detected in the obtained preview image, and changing a current output power value of the photographic lamp to be the determined first output power value, wherein the determined first output power value is one of the plurality of first output power values; or
    determining a second output power value of the photographic lamp corresponding to the obtained brightness value when no human face is detected in the obtained preview image, and changing the current output power value of the photographic lamp to be the determined second output power value, wherein the determined second output power value is one of the plurality of second output power values, wherein the determined second output power value is different from the determined first output power value.

2. The method according to claim 1, further comprising:
    controlling the photographic lamp flash at the current output power value, when the camera device captures image.

3. The method according to claim 1, wherein the human face is detected by comparing the obtained preview image with one or more pre-determined standard face templates.

4. The method according to claim 1, wherein the brightness value is obtained from the camera device or a light sensor of the electronic device.

5. The method according to claim 1, further comprising:
    generating a first reference table to list the plurality of first output power values and the corresponding brightness values; and
    generating a second reference table to list the plurality of second output power values and the corresponding brightness values.

6. The method according to claim 1, wherein the determined second output power value is less than the determined first output power value.

7. An electronic device, comprising:
    a photographic lamp;
    a camera device;
    a processor;
    a storage device storing a plurality of instructions, which when executed by the processor, causes the processor to:
    predetermine a plurality of first output power values corresponding to a plurality of brightness values, for the photographic lamp used when the camera device is used to capture an image including a human face;
    predetermine a plurality of second output power values corresponding to the plurality of brightness values, for the photographic lamp used when no human face needs to be captured by the camera device;
    obtain a preview image from the camera device;
    determine whether the human face is detected in the obtained preview image by using the processor;
    obtain a brightness value of an ambient environment of the electronic device; and
    determine a first output power value of the photographic lamp corresponding to the obtained brightness value when the human face is detected in the obtained preview image, and changing a current output power value of the photographic lamp to be the determined first output power value, wherein the determined first output power value is one of the plurality of first output power values; or
    determine a second output power value of the photographic lamp corresponding to the obtained brightness value when no human face is detected in the obtained preview image, and changing the current output power value of the photographic lamp to be the determined second output power value, wherein the determined second output power value is one of the plurality of second output power values, wherein the determined second output power value is different from the determined first output power value.

8. The electronic device according to claim 7, wherein the processor further:
    controls the photographic lamp flash at the current output power value, when the camera device captures image.

9. The electronic device according to claim 7, wherein the processor detects the human face by comparing the obtained preview image with one or more pre-determined standard face templates.

10. The electronic device according to claim 7, wherein the processor obtains the brightness value from the camera device or a light sensor of the electronic device.

11. The method according to claim 7, wherein the processor further:

generates a first reference table to list the plurality of first output power values and the corresponding brightness values; and generates a second reference table to list the plurality of second output power values and the corresponding brightness values.

12. The electronic device according to claim 7, wherein the determined second output power value is less than the determined first output power value.

13. A non-transitory storage medium having stored thereon instructions that, when executed by a processor of an electronic device, causes the electronic device to perform a method for adjusting a photographic lamp of the electronic device, the electronic device comprising a camera device, the method comprising:

predetermining a plurality of first output power values corresponding to a plurality of brightness values, for the photographic lamp used when the camera device is used to capture an image including a human face;

predetermining a plurality of second output power values corresponding to the plurality of brightness values, for the photographic lamp used when no human face needs to be captured by the camera device;

obtaining a preview image from the camera device;

determining whether the human face is detected in the obtained preview image by using the processor;

obtaining a brightness value of an ambient environment of the electronic device; and determining a first output power value of the photographic lamp corresponding to the obtained brightness value when the human face is detected in the obtained preview image, and changing a current output power value of the photographic lamp to be the determined first output power value, wherein the determined first output power value is one of the plurality of first output power values; or determining a second output power value of the photographic lamp corresponding to the obtained brightness value when no human face is detected in the obtained preview image, and changing the current output power value of the photographic lamp to be the determined second output power value, wherein the determined second output power value is one of the plurality of second output power values, wherein the determined second output power value is different from the determined first output power value.

14. The non-transitory storage medium according to claim 13, wherein the method further comprises:

controlling the photographic lamp flash at the current output power value, when the camera device captures image.

15. The non-transitory storage medium according to claim 13, wherein the human face is detected by comparing the obtained preview image with one or more pre-determined standard face templates.

16. The non-transitory storage medium according to claim 13, wherein the brightness value is obtained from the camera device or a light sensor of the electronic device.

17. The non-transitory storage medium according to claim 13, wherein the method further comprises:

generating a first reference table to list the plurality of first output power values and the corresponding brightness values; and generating a second reference table to list the plurality of second output power values and the corresponding brightness values.

* * * * *